No. 658,093. Patented Sept. 18, 1900.
E. W. McCASLIN.
VELOCIPEDE WHEEL RIM AND ATTACHMENT.
(Application filed July 24, 1899.)
(No Model.)
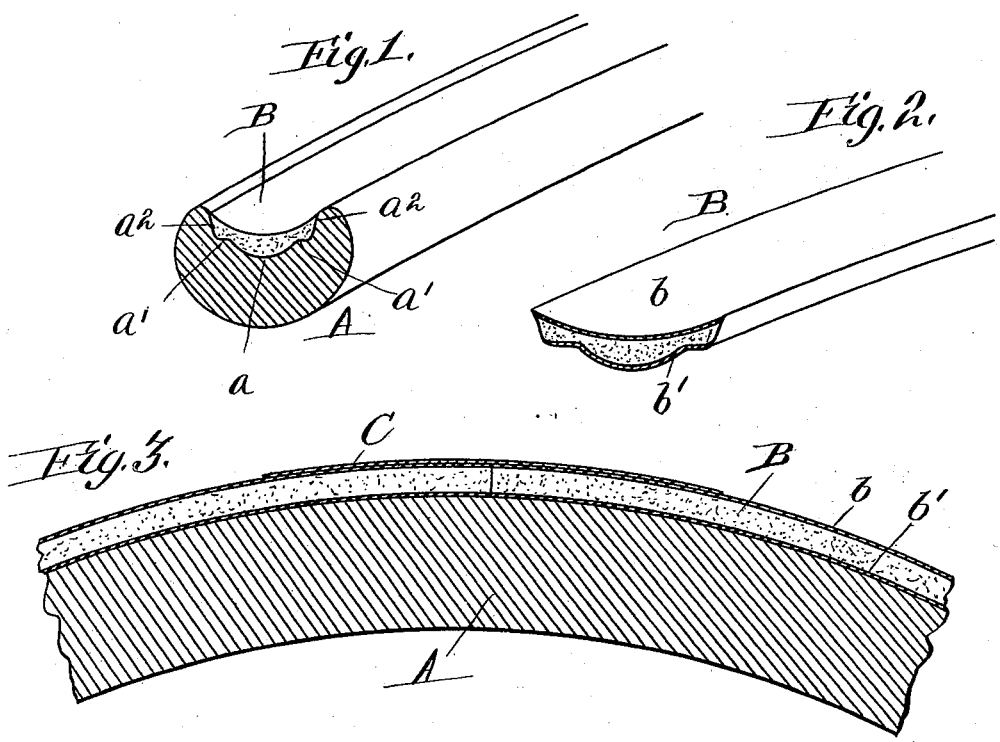
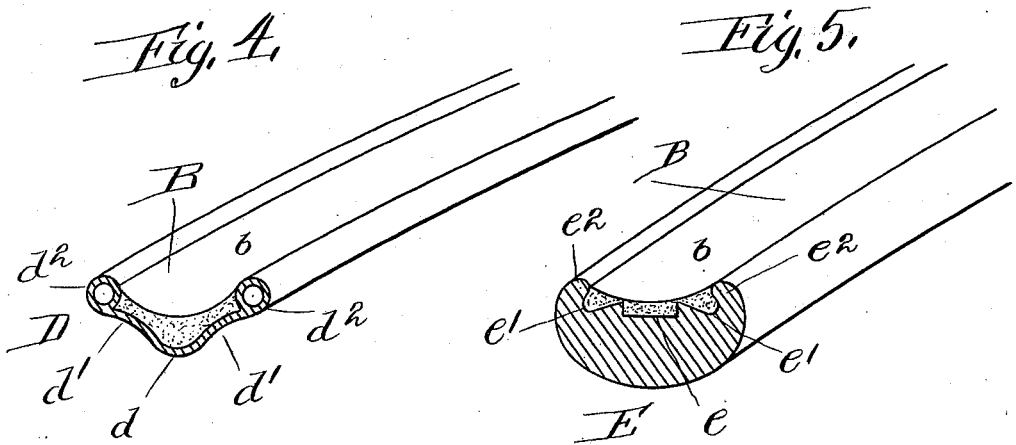
Witnesses:
A. F. Durand
Agnes A. Devine
Inventor:
Elton W. McCaslin
by Chas. L. Page
Atty.

UNITED STATES PATENT OFFICE.

ELTON W. McCASLIN, OF CHICAGO, ILLINOIS, ASSIGNOR TO THE MORGAN & WRIGHT, OF SAME PLACE.

VELOCIPEDE WHEEL-RIM AND ATTACHMENT.

SPECIFICATION forming part of Letters Patent No. 658,093, dated September 18, 1900.

Application filed July 24, 1899. Serial No. 724,935. (No model.)

*To all whom it may concern:*

Be it known that I, ELTON W. McCASLIN, a citizen of the United States, residing at Chicago, in the county of Cook and State of Illinois, have invented a certain new and useful Improvement in Velocipede Wheel-Rims and Attachments Therefor, of which the following is a specification.

The object of my invention is to readily convert a bicycle or other velocipede wheel-rim of the "clincher" type into what is commonly known as a "crescent" rim and also to permit the rim thus converted to be readily changed back to a rim of the clincher type—that is to say, a rim adapted for what is known as a "clincher-tire."

To the attainment of the foregoing and other useful ends my invention consists in matters hereinafter set forth.

In the accompanying drawings, Figure 1 represents in perspective a portion of a wheel-rim primarily of the clincher type converted into a crescent rim. Fig. 2 shows in perspective a portion of the converting-strip employed in Fig. 1 on a slightly-larger scale. Fig. 3 is a section taken longitudinally through a portion of the wheel-rim along the middle line thereof. Fig. 4 is a view similar to Fig. 1, showing a slightly-modified form of clincher-rim converted into a crescent rim. Fig. 5 is a like view showing another form of clincher-rim converted into a crescent rim.

In Figs. 1 and 3, A indicates a wooden rim of the clincher type—that is to say, it has a longitudinal middle channel $a$, longitudinal seats $a'$, respectively, at opposite sides of the middle channel, and side walls $a^2$, which rise from the outer edges of the seats $a'$, it being understood that in the completed wheel-rim the channel $a$, the seats $a'$, and the walls $a^2$ are all annular. The rim thus described may be said to come under the clincher type and is adapted when thus constructed to receive a tire having a longitudinally-divided casing which is provided along its edges with wire rings adapted to bear upon the seats $a'$ when the tire is in place and in an inflated condition.

B represents a strip composed of rubber or rubber composition, with or without a facing of cloth, it being preferable, however, to form the strip of any suitable rubber composition and to provide it with face-strips $b\,b$ of fabric. This strip, which I term a "converting-strip," is adapted on one side to fit the groove or channel $a$, the seats $a'$, and the side walls $a^2$ of the wheel-rim, the opposite side of said strip being transversely concave, so that when the strip is applied to the rim A, as illustrated in Fig. 1, the rim will be converted into a crescent rim adapted to provide a seat for an annular tubular pneumatic tire of the Morgan & Wright type. The converting-strip B can be made of such length that when applied to the wheel-rim its ends will meet and abut. The converting-strip can be cemented to the wheel-rim along its entire length and at different points, and it can be further secured upon the rim by a strip C of fabric laid over the abutting ends of the converting-strip and cemented to the latter, as in Fig. 3, it also being observed that, if desired, the strip C can be made to provide the sole means for securing the converting-strip to the wheel-rim.

When desired, the user can remove the converting-strip by first tearing off the strip C and then tearing the converting-strip from the wheel-rim if the converting-strip is cemented thereto.

In Fig. 4 the wheel-rim D is understood to be made of metal and is so formed to provide a middle channel $d$, upwardly-diverging side walls $d'$, and curled edges $d^2$ for substantially the purposes of the construction of wheel-rim shown in Fig. 1.

In Fig. 4 the converting-strip B is similar to the strip shown in Figs. 1 and 2, with the exception that as a matter of form it has one of its sides adapted to the particular formation of the wheel-rim D, its opposite sides, however, being concave in cross-section, so that when the strip is applied it will convert the wheel-rim into a crescent rim.

In Fig. 5 the wheel-rim E is an ordinary wood rim. It is formed with a central channel $e$, rectangular in cross-section, and side channels $e'$, which serve to provide the rim with side walls $e^2$, hook-shaped in cross-section.

The converting-strip B has one of its sides $b$ made concave in cross-section, as in preceding figures, while its opposite side is adapted to fit the tread side of the wheel-rim involving the channels $e\ e'$ and the hook-shaped side walls $e^2$.

The wheel-rim E is primarily adapted for a clincher-tire divided along its base, which latter is molded to fit the grooves $e\ e'$; but when the strip B is applied, as shown, the rim E is converted into a crescent rim adapted for a tubular tire of the Morgan & Wright type or for a single-tube tire.

By the foregoing arrangement the user of a bicycle or like velocipede can start out with clincher-tires and yet at any time substitute annular tubular tires either of the Morgan & Wright type or of the hose-pipe or single-tube type, it being obvious that it will only be necessary to first apply to the wheel-rim the converting-strip B, which will convert the clincher-rim into a crescent rim. These strips can be made quite cheaply and economically and can be furnished riders of wheels at a very small cost.

Where riders happen to have wheels with rims for clincher-tires and desire to use single or double tube tires of the clincher type, it will not be necessary for them to purchase new wheels, since by using the converting-strip B the wheel-rims can be readily converted into crescent-rims.

A further advantage is that although the wheel-rim may have thus been converted into a crescent rim it can at any time be converted back into a rim for a clincher-tire, and hence should the rider at any time find it necessary to immediately provide a new tire and should find it more convenient, owing to locality, to get hold of a clincher-tire he can readily use the clincher-tire by removing the converting-strip B.

What I claim as my invention is—

1. The combination with a bicycle or other velocipede wheel-rim of the clincher type, of a converting-strip applied and fitted to such rim and converting the same into a crescent rim adapted for a tubular tire such as set forth.

2. A clincher-tire wheel-rim provided with a converting-strip, such as set forth, applied to the periphery of the wheel-rim with its ends abutting or in juxtaposition, and a fastening-strip C applied over said ends of the strip.

ELTON W. McCASLIN.

Witnesses:
ARTHUR F. DURAND,
AGNES A. DEVINE.